US006961709B2

(12) United States Patent
Goodwin, III

(10) Patent No.: US 6,961,709 B2
(45) Date of Patent: Nov. 1, 2005

(54) SYSTEM AND METHOD OF MANAGING INVENTORY

(75) Inventor: John C. Goodwin, III, Suwanee, GA (US)

(73) Assignee: NCR Corporation, Dayton, OH (US)

(*) Notice: Subject to any disclaimer, the term of this patent is extended or adjusted under 35 U.S.C. 154(b) by 166 days.

(21) Appl. No.: 09/824,845

(22) Filed: Apr. 2, 2001

(65) Prior Publication Data

US 2002/0143635 A1 Oct. 3, 2002

(51) Int. Cl.[7] .......................... G06K 17/00; G06F 17/60
(52) U.S. Cl. .......................... 705/22; 705/28; 705/16; 705/21; 705/23
(58) Field of Search .............................. 705/22, 28, 7, 705/16, 20, 21, 23; 340/572.1

(56) References Cited

U.S. PATENT DOCUMENTS

| | | | |
|---|---|---|---|
| 4,816,824 A | 3/1989 | Katz et al. ................. | 340/5.86 |
| 4,821,291 A | 4/1989 | Stevens et al. | |
| 5,151,684 A | 9/1992 | Johnsen .................... | 340/572.1 |
| 5,239,167 A | 8/1993 | Kipp .......................... | 235/383 |
| 5,461,561 A * | 10/1995 | Ackerman et al. ............ | 705/28 |
| 5,537,312 A * | 7/1996 | Sekiguchi et al. ............ | 705/14 |
| 5,929,770 A * | 7/1999 | Faita ........................ | 340/10.41 |
| 5,963,134 A * | 10/1999 | Bowers et al. ........... | 340/572.1 |
| 6,016,481 A * | 1/2000 | Failing et al. ................. | 705/28 |
| 6,019,394 A | 2/2000 | Chenoweth et al. .......... | 283/81 |
| 6,269,342 B1 * | 7/2001 | Brick et al. .................... | 705/20 |
| 6,486,780 B1 * | 11/2002 | Garber et al. ............ | 340/572.1 |
| 2002/0038267 A1 * | 3/2002 | Can et al. ..................... | 705/28 |

FOREIGN PATENT DOCUMENTS

| | | |
|---|---|---|
| EP | 0 749 092 | 12/1996 |
| EP | 0 984 379 | 3/2000 |
| EP | 1 049 042 | 11/2000 |
| EP | 1 176 565 | 1/2002 |
| EP | 1 191 503 | 3/2002 |
| GB | 2 354 620 | 3/2001 |

OTHER PUBLICATIONS

Alaimo, Dan, "Vons will install electronic labels", May 14, 1990, Supermarket News, vol.: 40, No.: 20, p.: 50(1).*
"NCR Eliminates Surprises for Price Conscious Shoppers", PR Newswire, Feb. 7, 1997.□□□□.*
"NCR Wireless Price Management Solution Automates Shelf Pricing at K–VA–T Food City Store", PR Newswire, Aug. 20, 1998.*

* cited by examiner

*Primary Examiner*—F. Zeender
(74) *Attorney, Agent, or Firm*—Paul W. Martin

(57) ABSTRACT

An inventory management system and method which wirelessly interrogate product labels to determine inventory. The system includes an electronic price label system including electronic displays which display price information and interrogators which wirelessly obtain identification information from product labels, and a computer which receives first identification information from first product labels affixed to first instances of a product adjacent one of the electronic displays and one of the interrogators, determines a first amount of the product from the first identification information, receives second identification information from second product labels affixed to second instances of the product which have been sold, determines a second amount of the product from the second identification information, receives third identification information from third product labels affixed to third instances of the product adjacent the electronic price label, and determines a third amount of the product from the third identification information representing a current inventory amount.

6 Claims, 2 Drawing Sheets

SYSTEM AND METHOD OF MANAGING INVENTORY

BACKGROUND OF THE INVENTION

The present invention relates to radio frequency identification devices and electronic price label systems, and more specifically to a system and method of managing inventory.

EPL systems typically include a plurality of EPLs for merchandise items in a transaction establishment. EPLs typically display the price of corresponding merchandise items on store shelves and are typically attached to a rail or shelf channel along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file.

RFID technology provides an alternative to bar code reader technology for distinguishing and recording items for purchase. Some of the uses of RFID technology are disclosed in U.S. Pat. No. 6,019,394 assigned to the assignee of the present invention. This patent is hereby incorporated by reference.

Store associates must perform routine tasks throughout the store and require information to support operation of the store. Inventory management is on routine task which can be labor intensive. Store associates must routinely count and report numbers of items and track their locations within the store.

Therefore, it would be desirable to combine the communication capabilities of electronic price label systems with RFID technology in order to perform inventory management.

SUMMARY OF THE INVENTION

In accordance with the teachings of the present invention, a system and method of managing inventory is provided.

The system includes an electronic price label system including electronic displays which display price information and interrogators which wirelessly obtain identification information from product labels, and a computer which receives first identification information from first product labels affixed to first instances of a product adjacent one of the electronic displays and one of the interrogators, determines a first amount of the product from the first identification information, receives second identification information from second product labels affixed to second instances of the product which have been sold, determines a second amount of the product from the second identification information, receives third identification information from third product labels affixed to third instances of the product adjacent the electronic price label, and determines a third amount of the product from the third identification information representing a current inventory amount.

The inventory management method includes the steps of wirelessly receiving first identification information from first product labels affixed to first instances of a product by an electronic price label adjacent the first instances, determining a first amount of the product from the first identification information, wirelessly receiving second identification information from second product labels affixed to second instances of the product which have been sold, determining a second amount of the product from the second identification information, wirelessly receiving third identification information from third product labels affixed to third instances of the product by the electronic price label adjacent the third instances, and determining a third amount of the product from the third identification information representing a current inventory amount.

It is accordingly an object of the present invention to provide a system and method of managing inventory.

It is another object of the present invention to provide a system and method of managing inventory which combines communication capabilities of electronic price label systems with RFID technology.

It is another object of the present invention to reduce the amount of time spent in manually counting products in a store.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
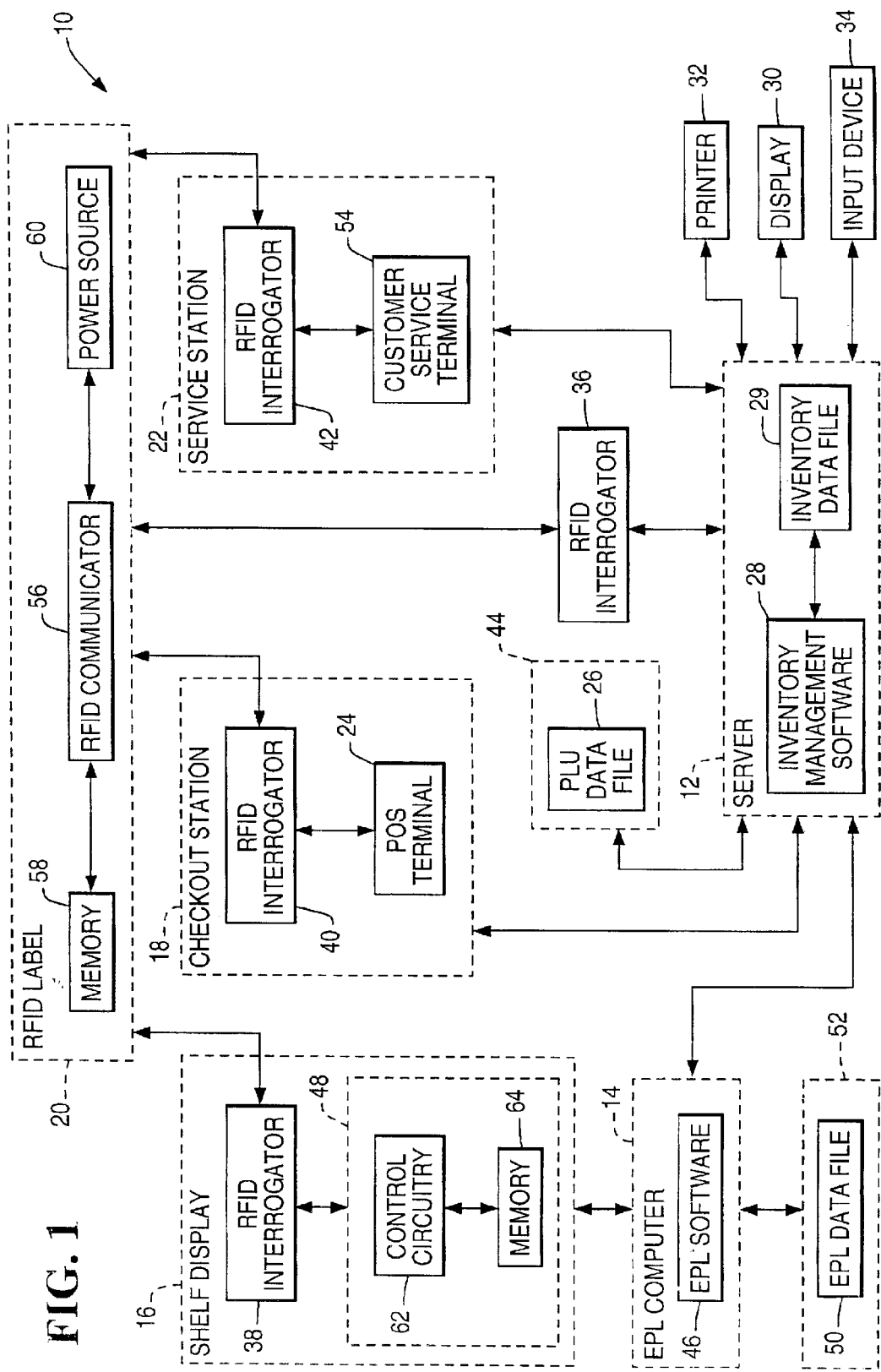
FIG. 1 is a block diagram of a transaction processing system.

Referring now to FIG. 1, transaction system 10 primarily includes server 12, EPL computer 14, shelf manager 16, checkout station 18, and radio frequency identification (RFID) label 20. Transaction system 10 may additionally include service station 22.

Server 12 handles price requests from POS terminal 24. POS terminal 24 sends item identification information to server 12 and server 12 returns the corresponding price from PLU data file 26. PLU data file is stored within storage medium 44.

Server 12 also executes inventory management software 28 which tracks inventory numbers on store shelves, tracks purchases at POS terminal 24, tracks returns and exchanges at service station 22, and may also track incoming shipments. Inventory information is stored within inventory data file 29 and is reported to inventory management software 28 by RFID interrogators 36–42, which may include RF transceivers.

Inventory management software 28 provides reports which may be displayed by display 30 or printed by printer 32. A store employee may manage reporting and data entry through input device 34, which may include a keyboard.

EPL computer 14 executes EPL software 46. EPL software 46 is responsible for scheduling and transmitting price data to EPLs 48. EPL software 46 obtains prices from PLU data file 26.

EPL software 46 also periodically sends messages to EPLs 48 requesting current quantities of items associated with EPLs 48. EPL software 46 activates RFID interrogators 38. EPL software 46 forwards received shelf inventory information to inventory management software 28.

Communication between EPL computer 14 and EPLs 48 may be wireless or wired communication. EPLs 48 includes control circuitry 62 and memory 64.

Control circuitry 52 controls operation of EPL 48. Control circuitry 62 receives incoming messages from EPL computer 14 and acknowledges messages from EPL computer 14. Control circuitry 62 also receives shelf inventory information from RFID interrogator 38 and stores the shelf inventory information in memory 64 until it can be sent to EPL computer 14.

EPL software 46 maintains EPL data file 50 which includes EPL identification information and price verification information. EPL data file 50 is stored within storage medium 52.

EPL shelf manager 16 includes RFID interrogator 38 and EPL 48. RFID interrogator 38 receives identification information from nearby items bearing RFID labels 20. RFID interrogator 38 counts items having identification information associated with EPL 48 and communicates the number to EPL software 46 through EPL 48. RFID interrogator 38 may be mounted to shelves or integrated into shelves.

Checkout station 18 includes POS terminal 24 and RFID interrogator 40. During checkout, RFID interrogator 40 obtains identification information from items labeled with RFID labels 20 and reports the identification information to POS terminal 24. POS terminal 24 sends the identification information to server 12 with price requests. After receiving price information for the items from server 12, POS terminal 24 completes a sale of the items by accepting payment. POS terminal 24 also sends inventory adjustment information to server 12.

Service station 22 includes customer service terminal 54 and RFID interrogator 42. RFID interrogator 42 obtains identification from returned or exchanged items bearing RFID labels 20. Customer service terminal 54 completes any monitory transfers between the store and the customer, and sends inventory adjustment information to server 12.

One embodiment of RFID label 20 is active and includes RFID communicator 56, memory 58, and power source 60. Label communicator 56 sends item identification information stored in RFID memory 58 to RFID interrogators 36–42. Label communicator 56 may include an RF transceiver.

Memory 58 stores item identification information and may include a read-only memory (ROM) for one-time use, or a programmable ROM (EPROM) for repeated use.

Power source 60 may include a battery.

RFID label 20 may also be a passive label. Passive RFID labels use very little energy and may only include RFID communicator 56. Power may be derived from radio waves.

RFID communicator 56 may include a reflective antenna which has a frequency which is unique among RFID labels 20. RFID communicator 56 communicates RFID label identification information which must be cross-referenced to obtain item identification information and corresponding price information. RFID label identification may also be stored in EPL data file 50 with item identification information. RFID communicator 56 may include a number of antennas, such as conductive ink antennas.

RFID labels 20 may vary in size, depending upon product size, and may be visible or hidden when attached to products. RFID label 20 may be removably or permanently attached to products.

Figure 2:
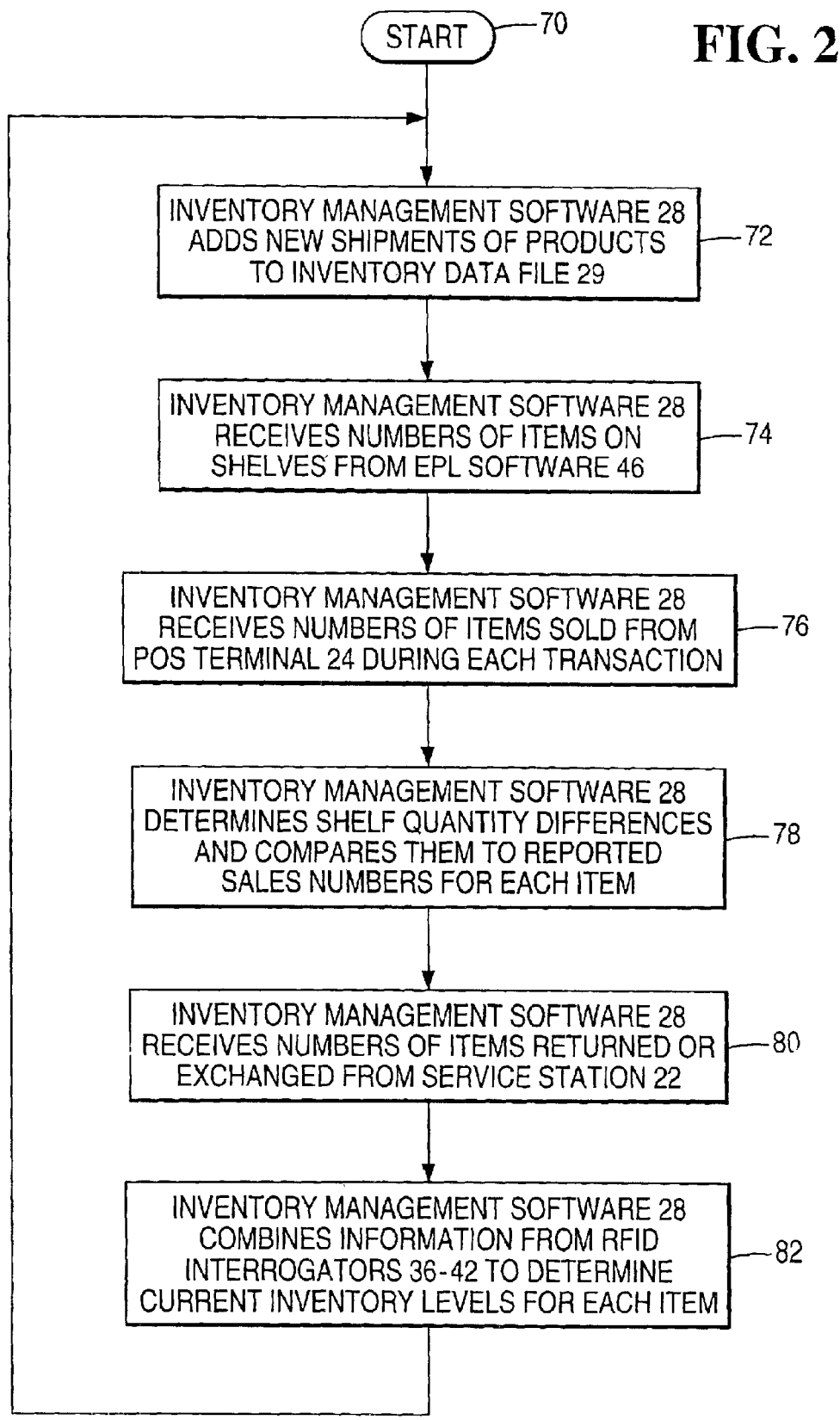
FIG. 2 is a flow diagram illustrating the method of the present invention.

Turning now to FIG. 2, the inventory management method is illustrated in more detail beginning with START 70.

In step 72, inventory management software 28 adds new shipments of products to inventory data file 29. RFID interrogator 36 obtains identification information from items bearing RFID labels 20. The identification information includes item identification information or RFID label identification information, depending upon the type of RFID labels 20. Item identification information for products having active RFID labels 20 may be obtained from memory 58. Item identification information for products having passive RFID labels 20 must be entered manually and cross-referenced to RFID label identification information. Items not bearing RFID labels 20 are entered manually through input device 34 or through a barcode reader if labeled with barcodes.

In step 74, inventory management software 28 receives numbers of items on shelves from EPL software 46. EPL software 46 periodically sends messages to EPLs 48 requesting quantity information.

In step 76, inventory management software 28 receives numbers of items sold from POS terminal 24 during each transaction.

In step 78, inventory management software 28 determines shelf quantity differences and compares the shelf quantity differences to reported sales numbers for each item. In this way, inventory management software 28 can report the number of items which are removed from shelves and not purchased.

In step 80, inventory management software 28 receives numbers of items returned or exchanged from service station 22.

In step 82, inventory management software 28 combines information from RFID interrogators 36–42 to determine a current inventory for each item labeled with RFID label 20. Store personnel may then make decisions about future orders.

Although the present invention has been described with particular reference to certain preferred embodiments thereof, variations and modifications of the present invention can be effected within the spirit and scope of the following claims.

I claim:

1. A method of managing inventory comprising the steps of:

wirelessly receiving first identification information from first product labels affixed to first instances of a product by a product label interrogator in an electronic price label adjacent the first instances, wherein the first instances of the product include second instances of the product to be removed for purchase by customers and third instances to be left adjacent the electronic price label, and wherein the first product labels include second product labels affixed to the second instances of the product and the third product labels affixed to the third instances of the product;

sending a message containing the first identification information to an electronic price label system computer by the electronic price label;

sending the first identification information to an inventory management computer by the electronic price label system computer;

determining a first amount of the product from the first identification information by the inventory management computer;

wirelessly receiving second identification information from the second product labels affixed to the second instances of the product during sale of the second instances of the product by a point-of-sale computer;

sending the second identification information to the inventory management computer by the point-of-sale computer;

determining a second amount of the product from the second identification information by the inventory management computer;

wirelessly receiving third identification information from the third product labels affixed to the third instances of the product by the electronic price label;

sending another message containing the third identification information to the electronic price label system computer by the electronic price label;

sending the third identification information to the inventory management computer by the electronic price label system computer; and determining a third amount of the product adjacent the electronic price label from the third identification information representing a current inventory amount of the product by the inventory management computer.

2. The method as recited in claim 1, further comprising the steps of:

determining a difference amount between the first and third amounts by the inventory management computer; and comparing die difference amount to the second amount by the inventory management computer to determine a fourth amount of the product including fourth instances of the first instances of the product which were removed from the electronic price label but not purchased.

3. The method as recited in claim 1, further comprising the steps of:

wirelessly receiving fourth identification information from fourth product labels affixed to fourth instances of the product, not included in the first instances of the product, which are returned by customers by a customer service computer;

sending the fourth identification information to the inventory management computer by the customer service computer;

determining a fourth amount of the product from the fourth identification information by the inventory management computer; and adding the fourth amount to the third amount to obtain a new current inventory amount of the product by the inventory management computer.

4. The method as recited in claim 1, further comprising the step of:

determining from the third amount whether to order additional instances of the product by the inventory management computer.

5. A method of managing inventory comprising the steps of:

receiving first identification information stored in first product labels affixed to first instances of a product from a first product label interrogator by control circuitry in an electronic price label adjacent the first instances, wherein the first instances of the product include second instances of the product to be removed for purchase by customers and third instances to be left adjacent the electronic price label, and wherein the first product labels include second product labels affixed to the second instances of the product and the third product labels affixed to the third instances of the product;

sending a message containing the first identification information to an electronic price label system computer by the control circuitry;

sending the first identification information to an inventory management computer by the electronic price label system computer;

determining a first amount of the product from the first identification information by the inventory management computer;

receiving second identification information stored in the second product labels affixed to the second instances of the product from a second product label interrogator by a point-of-sale computer that processed sale of the second instances;

sending the second identification information to the inventory management computer by the point-of-sale computer;

determining a second amount of the product from the second identification information by the inventory management computer;

receiving third identification information from the third product labels affixed to the third instances of the product from the first product label interrogator by the control circuitry in the electronic price label adjacent the third instances;

sending another message containing the third identification information to the electronic price label system computer by the electronic price label;

sending the third identification information to the inventory management computer by the electronic price label system computer; and determining a third amount of the product adjacent the electronic price label from the third identification information representing a current inventory amount of the product by the inventory management computer.

6. An inventory management system comprising:

an electronic price label system including electronic displays for displaying price information, product label interrogators in the electronic displays for wirelessly receiving identification information from product labels, and control circuitry in the electronic displays for controlling display of price information, for controlling reception of the identification information from the product labels by the interrogators, and for wirelessly sending the identification information through the electronic price label system; and an inventory management computer for receiving via an electronic price label computer first identification information from first product labels affixed to first instances of a product from the control circuitry of an associated electronic display adjacent the first instances, wherein the first instances of the product include second instances of the product to be removed for purchase by customers and third instances to be left adjacent the associated electronic display, and wherein the first product labels include second product labels affixed to the second instances of the product and the third product labels affixed to the third instances of the product, and wherein the inventory management computer additionally determines a first amount of the product from the first identification information, receives second identification information from the second product labels affixed to the second instances of the product which have been sold, determines a second amount of the product from the second identification information, receives via the electronic price label computer third identification information from the third product labels affixed to the third instances of the product from the control circuitry of the associated electronic display, and determines a third amount of the product adjacent the associated electronic display from the third identification information representing a current inventory amount of the product.

* * * * *